US012116895B2

United States Patent

(12) United States Patent
Iltchev et al.

(10) Patent No.: US 12,116,895 B2
(45) Date of Patent: Oct. 15, 2024

(54) MULTISTAGE PUMP BODY AND MULTISTAGE GAS PUMP

(71) Applicant: ATELIERS BUSCH SA, Chevenez (CH)

(72) Inventors: Théodore Iltchev, Grandvillars (FR); Sergio Dessi, Beaucourt (FR); Stéphane Varrin, Coeuve (CH)

(73) Assignee: ATELIERS BUSCH SA, Chevenez (CH)

( * ) Notice: Subject to any disclaimer, the term of this patent is extended or adjusted under 35 U.S.C. 154(b) by 289 days.

(21) Appl. No.: 17/424,513

(22) PCT Filed: Feb. 6, 2019

(86) PCT No.: PCT/EP2019/052939
§ 371 (c)(1),
(2) Date: Jul. 21, 2021

(87) PCT Pub. No.: WO2020/160770
PCT Pub. Date: Aug. 13, 2020

(65) Prior Publication Data
US 2022/0127962 A1 Apr. 28, 2022

(51) Int. Cl.
*F04C 18/12* (2006.01)
*F01C 21/10* (2006.01)
(Continued)

(52) U.S. Cl.
CPC ............ *F01C 21/10* (2013.01); *F04C 18/123* (2013.01); *F04C 18/126* (2013.01); *F04C 18/14* (2013.01);
(Continued)

(58) Field of Classification Search
CPC ........ F01C 21/20; F04C 18/14; F04C 18/123; F04C 18/126; F04C 23/001; F04C 29/04;
(Continued)

(56) References Cited

U.S. PATENT DOCUMENTS 6,599,097 B2 * 7/2003 Kim ........................ F04C 29/04 417/205
8,573,956 B2 11/2013 Suzuki
(Continued)

FOREIGN PATENT DOCUMENTS

DE 10106111 A1 8/2002
EP 2626562 B1 5/2016
(Continued)

OTHER PUBLICATIONS

Translation of International Search Report in PCT/EP2019/052939 dated Oct. 21, 2019, 6 pages.
(Continued)

*Primary Examiner* — Philip E Stimpert
(74) *Attorney, Agent, or Firm* — Tucker Ellis LLP

(57) ABSTRACT

A multistage pump body comprises a first pumping chamber (20) and a second pumping chamber (21). A connecting duct (**26*a*) puts an outlet (27) of the first pumping chamber (20) into communication with an inlet (28) of the second pumping chamber (21). A leak-tight conduit (40) is provided for the circulation of a cooling liquid. The connecting duct (26*a*) is a lateral duct of the multistage pump body. A heat-conducting wall (33) partially delimits the connecting duct (26*a*) and has an external surface (34) on the outside. At least a portion of the connecting duct (26*a*) passes between this external surface (34) of the heat-conducting wall (33) and the leak-tight conduit (40**).

12 Claims, 6 Drawing Sheets

(51) Int. Cl.

| | |
|---|---|
| ***F04C 18/14*** | (2006.01) |
| ***F04C 23/00*** | (2006.01) |
| ***F04C 29/04*** | (2006.01) |
| ***F04C 29/12*** | (2006.01) |

(52) U.S. Cl.
CPC ............ *F04C 23/001* (2013.01); *F04C 29/04* (2013.01); *F04C 29/12* (2013.01); *F05B 2210/12* (2013.01)

(58) Field of Classification Search
CPC ...... F04C 29/12; F04C 2240/30; F04D 29/40; F04D 29/403; F04D 29/584
USPC .......................................................... 417/243
See application file for complete search history.

(56) References Cited

U.S. PATENT DOCUMENTS

2003/0077195 A1* 4/2003 Okada .................. F04C 29/068 418/83
2012/0121442 A1 5/2012 Kim

FOREIGN PATENT DOCUMENTS

JP H0295792 A 4/1990
JP 2001020884 A 1/2001
JP 2001027190 A 1/2001
JP 2014055580 A 3/2014

OTHER PUBLICATIONS

International Search Report and Written Opinion iin PCT/EP2019/052939 dated Oct. 21, 2019, 12 pages.

* cited by examiner

MULTISTAGE PUMP BODY AND MULTISTAGE GAS PUMP

TECHNICAL FIELD OF THE INVENTION

The present invention concerns a multistage pump body, as well as a multistage pump, which can be in particular a vacuum pump. In the following and in the attached claims, the term "pump" covers gas drive pumps, vacuum pumps and also compressors, while the term "pump body" designates a part that can belong to such a gas drive pump, such a vacuum pump or such a compressor.

STATE OF THE ART

It is known that a multistage pump is a pump comprising a plurality of successive pumping chambers, that connecting ducts are connected in such a way that compressed gas in one pumping chamber, other than the last, is conducted to the inlet of the following pumping chamber.

The gas compression carried out in each pumping chamber results in a release of heat for the removal of which various cooling devices have been proposed.

Described in the European patent EP 2 626 562 B1 is a multistage pump in which the gas, during its path between two successive pumping chambers, flows along a plate provided with cooling fins and intended to remove the heat to the outside atmospheric air, by simple natural convection.

Another solution to remove the heat released during the compression of a gas in a multistage pump uses heat exchangers, in each of which the gas is cooled during its journey between two successive pumping chambers. The document JP 2001-27190 proposes a cooling based on this other solution.

It is likewise known to cool a multistage pump by means of circulation of a cooling liquid such as water. In the U.S. Pat. No. 8,573,956 B2, the cooling circuit passes between the last pumping chamber and the second to last pumping chamber, then below the other pumping chambers. In the document JP 2014-55580, a straight tube for the flow of a cooling liquid passes either in a connecting duct for the gas between two pumping chambers, or between two consecutive pumping chambers.

Proposed in both the document JP 2001-20884 and the document JP 2-95792-95792 (JPH 0295792 A) is also a cooling by means of a cooling liquid. This cooling is an external cooling in that the cooling liquid passes around the pumping chambers and around the connecting ducts linking these pumping chambers to one another.

The cooling of the multistage pumps described in the above-mentioned documents and patents has an efficiency that is not totally satisfactory.

SUMMARY OF INVENTION

The object of the invention is at least to improve the efficiency of removal of the heat which is generated by the gas compression in a multistage pump body of a multistage pump when it is operating.

According to the invention, this object is attained by means of a multistage pump body comprising at least a first pumping chamber, a second pumping chamber, a connecting duct putting an outlet of the first pumping chamber into communication with an inlet of the second pumping chamber, as well as a leak-tight conduit for the circulation of a cooling liquid. The connecting duct is a lateral duct of the multistage pump body which comprises at least one heat-conducting wall partially delimiting the connecting duct and having an external surface on the outside. At least one portion of the connecting duct passes between this external surface of the heat-conducting wall and the leak-tight conduit.

Each of the first and second pumping chambers is designed to receive at least one member capable of producing a gas movement towards the downstream. During its compression in each of the first and second pumping chambers, the pumped gas heats up. When it passes in the connecting duct, this gas is cooled by means of the heat-conducting wall, which is itself cooled by the ambient atmospheric air. In this way, a first cooling of the multistage pump body takes place by natural convection and by radiation towards the ambient atmospheric air. Simultaneously, a second cooling of the multistage pump body is produced by a heat transfer to the cooling liquid circulating in the leak-tight conduit. A double cooling of the multistage pump body according to the invention thus takes place.

As it improves the cooling, the invention makes it possible to obtain a better pumping efficiency, which is an advantage. In particular, through an improvement of pumping efficiency, the maximum pumped flow rate can be increased. In other words, the invention has as an advantage that it makes it possible to increase the maximum flow rate that a pump can pump.

The multistage pump body defined above may incorporate one or more other advantageous features, singly or in combination, in particular from among those defined in the following.

Preferably, at least one portion of the leak-tight conduit passes between the connecting duct and at least one of the first and second pumping chambers. When such is the case, the cooling liquid circulating in the leak-tight conduit cools both the connecting duct and at least one of the first and second pumping chambers, which results in an even more efficient cooling.

Preferably, at least one portion of the leak-tight conduit passes between the first pumping chamber and the second pumping chamber. When such is the case, the cooling liquid circulating in the leak-tight conduit cools efficiently the first and second pumping chambers.

Preferably, the multistage pump body comprises at least one heat-conducting partition separating the connecting duct and the leak-tight conduit from one another. Such a heat-conducting partition efficiently removes heat from the connecting duct to the cooling liquid circulating in the leak-tight conduit.

Preferably, the multistage pump body comprises at least one heat-conducting partition separating the leak-tight conduit and the first pumping chamber from one another. Such a heat-conducting partition efficiently removes the heat from the first pumping chamber to the cooling liquid circulating in the leak-tight conduit.

Preferably, the leak-tight conduit partially wraps around the first pumping chamber and/or the second pumping chamber. When such is the case, the cooling of at least one of the first and second pumping chambers is very efficient.

Preferably, the leak-tight conduit comprises at least one inlet for the cooling liquid and at least one outlet for the cooling liquid.

Preferably, the multistage pump body comprises at least one axial passage for a rotating shaft, a segment of this axial passage connecting the first and second pumping chambers.

Preferably, the multistage pump body has a first side and a second side opposite the first side with respect to the axial passage, the connecting duct passing on the first side of the multistage pump body, the multistage pump body delimiting another connecting duct putting the outlet of the first pumping chamber into communication with the inlet of the second pumping chamber, this other connecting duct passing on the second side of the multistage pump body.

Preferably, the multistage pump body has a third side and a fourth side opposite the third side with respect to the axial passage, the outlet of the first pumping chamber being located on the third side of the multistage pump body, the inlet of the second pumping chamber being located on the fourth side of the multistage pump body.

Preferably, an inlet of the first pumping chamber is located on the fourth side of the multistage pump body, an outlet of the second pumping chamber being located on the third side of the multistage pump body.

Preferably, the connecting duct is a first connecting duct, the multistage pump body comprising a third pumping chamber and a second connecting duct which is a duct putting an outlet of the second pumping chamber into communication with an inlet of the third pumping chamber, the heat-conducting wall being a first heat-conducting wall, the multistage pump body comprising at least a second heat-conducting wall, this second heat-conducting wall partially delimiting the second connecting duct and having an external surface on the outside, at least one portion of the second connecting duct passing between this external surface of the second heat-conducting wall and the leak-tight conduit. When such is the case, the gas is cooled both during its passage in the first connecting duct and during its passage in the second connecting duct.

Preferably, the multistage pump body comprises two ends crossed by the or each axial passage, the external surface of the heat-conducting wall forming part of a lateral surface extending between the two ends of the multistage pump body.

Preferably, the heat-conducting wall comprises two opposing major surfaces and a constant thickness or not between these two opposing major surfaces, one of which is the external surface of the heat-conducting wall.

Since it is a lateral duct, the connecting duct puts the outlet of the first pumping chamber into communication with the inlet of the second pumping chamber without passing between the first and the second pumping chamber.

Preferably, over most of its length, the connecting duct has a cross section that is elongated in a direction substantially parallel to the axial passage.

The invention likewise has as subject matter a multistage pump which comprises a multistage pump body such as previously defined. The external surface of the heat-conducting wall is on the outside of the pump.

The multistage pump defined above may incorporate one or more other advantageous features, singly or in combination, in particular from among those defined in the following.

Preferably, the multistage pump comprises at least one first rotor to produce a displacement of gas towards the downstream in the first pumping chamber, at least one second rotor to produce a displacement of gas towards the downstream in the second pumping chamber and a rotating shaft carrying the first and second rotors.

Preferably, the multistage pump is a lobe pump or a claw pump or a gear pump and, preferably, it comprises at least one other first rotor in the first pumping chamber, at least one other second rotor in the second pumping chamber and another rotating shaft carrying the other first and second rotors, the first rotor and the other first rotor being able to produce a displacement of gas towards the downstream in the first pumping chamber by being driven in opposite directions, the second rotor and the other second rotor being able to produce a displacement of gas towards the downstream in the second pumping chamber by being driven in opposite directions.

BRIEF DESCRIPTION OF THE DRAWINGS

Other advantages and features will become clearer from the description which follows of a particular embodiment of the invention, given by way of non-limiting example, and represented in the attached drawings, among which.

DESCRIPTION OF A PREFERRED EMBODIMENT OF THE INVENTION

Figure 1:
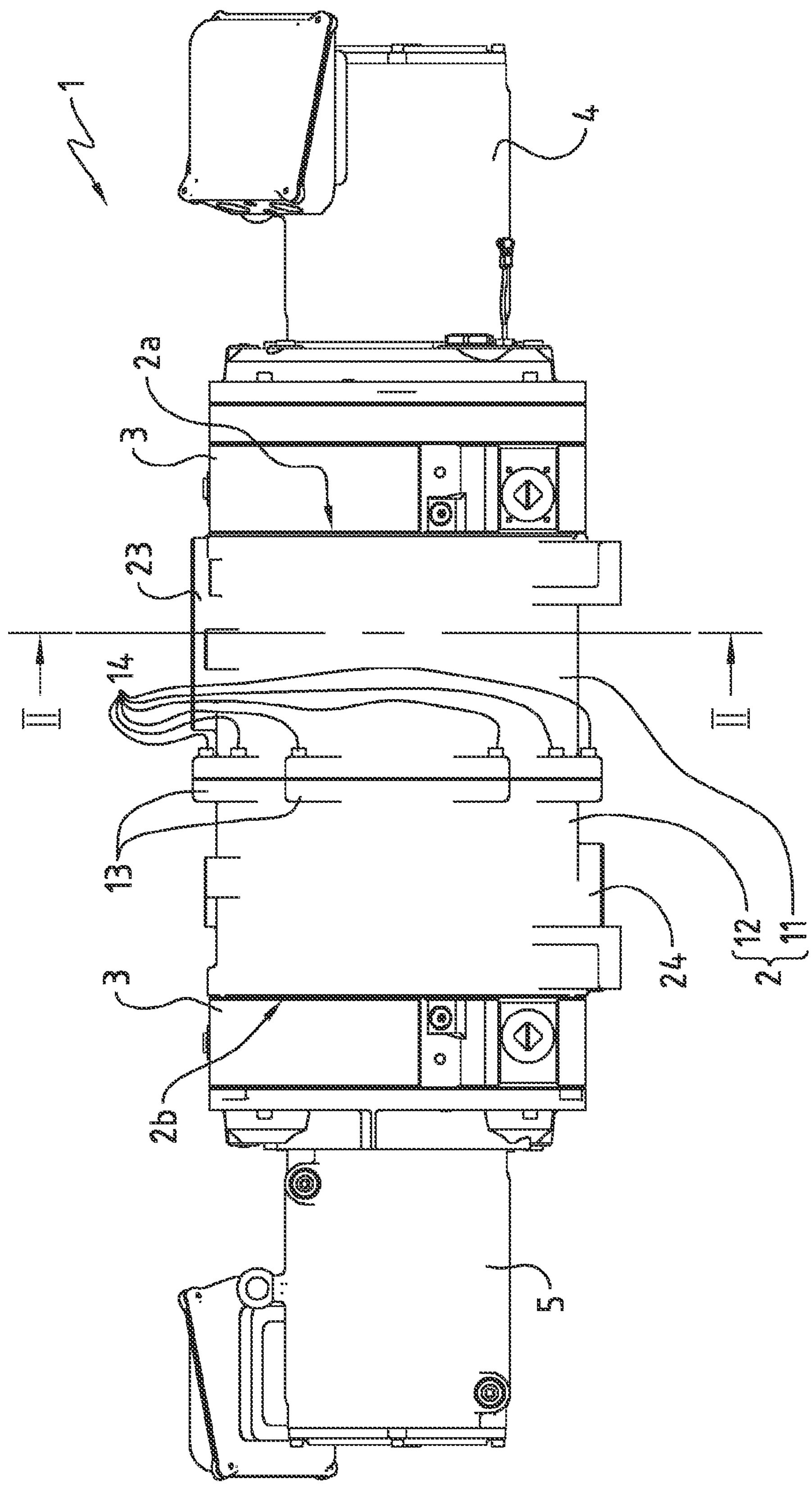
FIG. 1 is a lateral view of a multistage pump according to one embodiment of the invention.

A multistage pump 1 according to an embodiment of the invention is shown alone in FIG. 1. It comprises a multistage pump body 2, each end of which carries a casing 3 provided with one of two electric motors 4 and 5 synchronized with one another.

Figure 2:
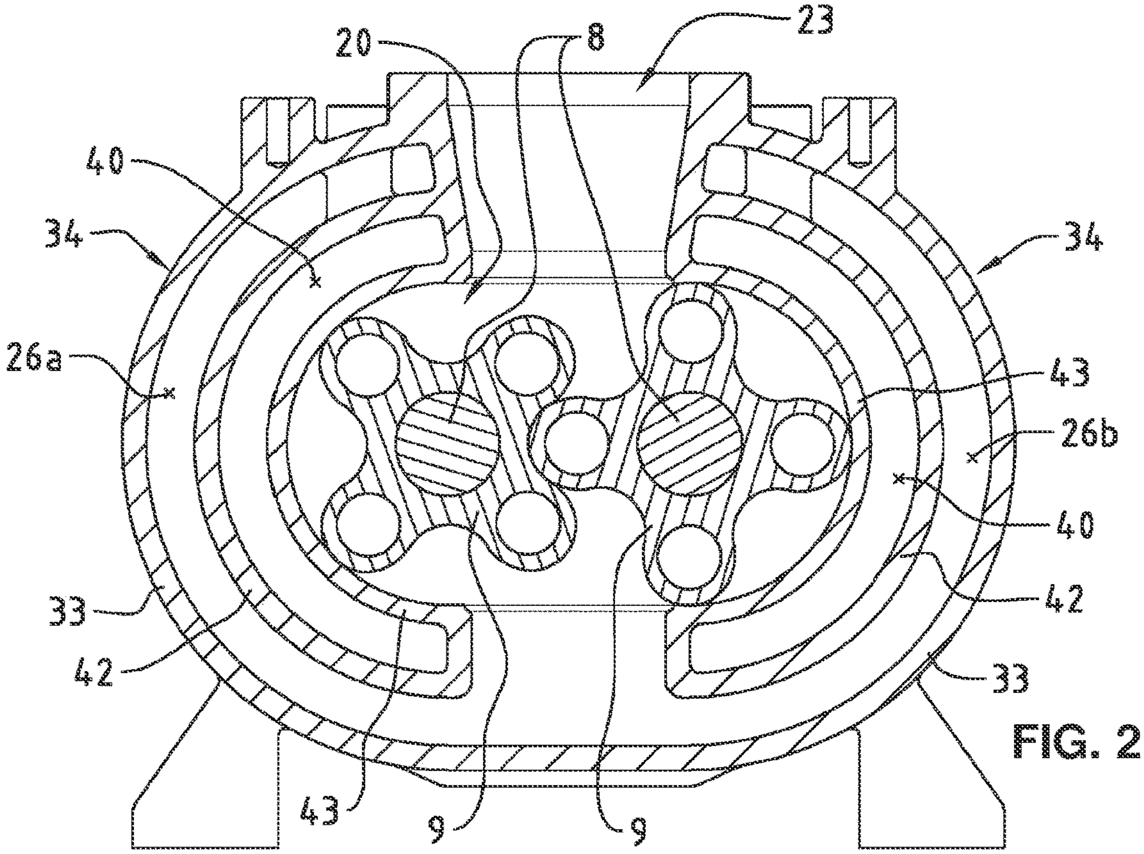
FIG. 2 is a sectional view along line II-II of FIG. 1 and represents the same multistage pump as that in FIG. 1.

As can be seen in FIG. 2, the multistage pump 1 is a lobe pump. The invention is not limited however to lobe pumps. For example, a claw pump or a gear pump may comply with the invention.

The multistage pump 1 comprises two rotating shafts 8, which are driven in rotation in opposite directions, the one by the electric motor 4 and the other by the electric motor 5. Each rotating shaft 8 carries three rotors, each of which forms part of a pair of complementary rotors 9. Each rotor 9 comprises a plurality of lobes, which are four in number in the represented example. The number of lobes of the rotors 9 could however be different from four.

Figure 3:
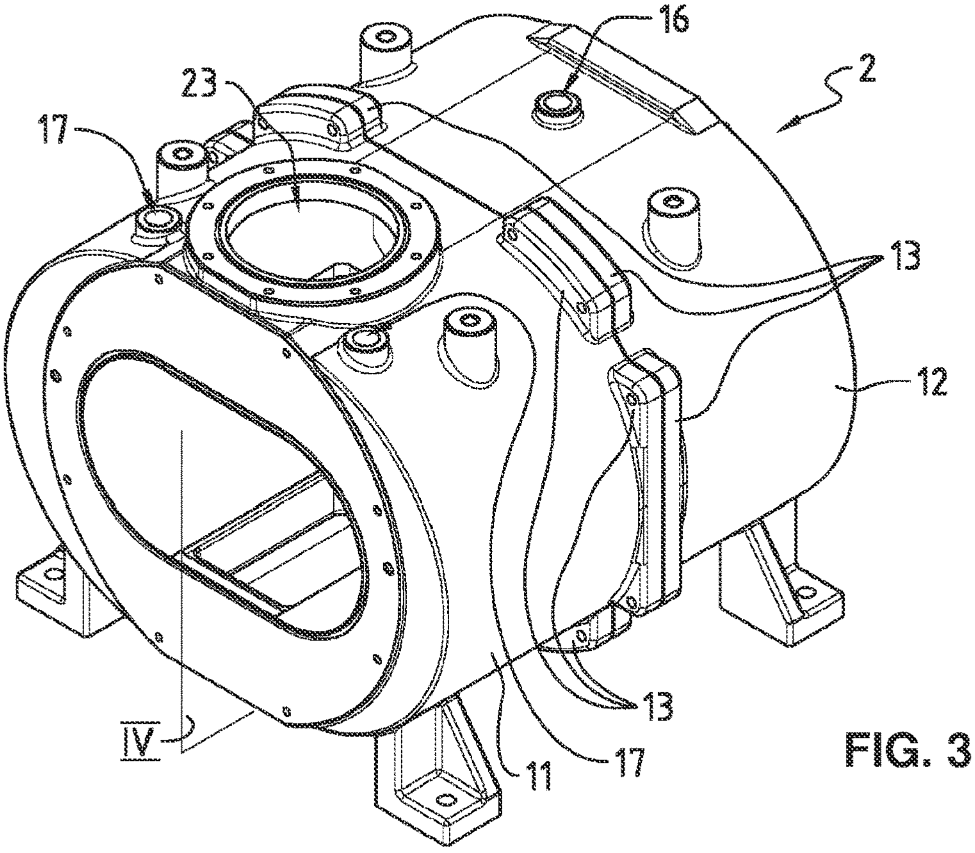
FIG. 3 is a perspective view of a multistage pump body which is according to an embodiment of the invention and which forms part of the multistage pump of FIGS. 1 and 2.

The multistage pump body 2 is represented alone in FIG. 3. It is made up of two housings 11 and 12, each of which has a discontinuous mounting flange 13. Visible only in FIG.

1, screws 14 mounted at the mounting flanges 13 secure the housings 11 and 12 to one another by clamping.

The multistage pump body 2 comprises an inlet 16 for a cooling liquid, as well as two outlets 17 for the same cooling liquid.

Figure 4:
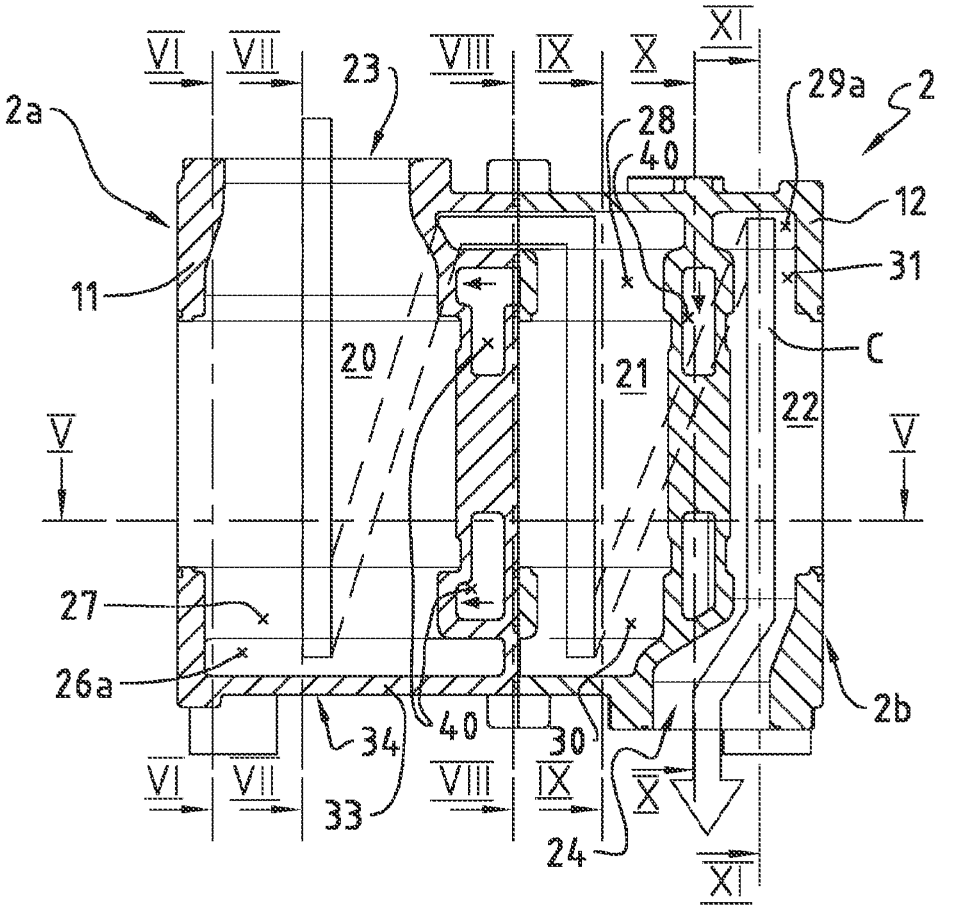
FIG. 4 is a longitudinal sectional view along the vertical plane IV of FIG. 3 and represents the same multistage pump body as that in FIG. 3.

As can be seen in FIG. 4, the multistage pump body 2 delimits a plurality of successive pumping chambers, which are aligned in a direction parallel to the rotating shafts 8 and which are a first pumping chamber 20, a second pumping chamber 21 following the first pumping chamber 20 and a third pumping chamber 22 following the second pumping chamber 21.

In the example represented, the pumping chambers 20 to 21 <sic. 22> are three in number, but their number could be different from three.

As can be seen in FIG. 2, a pair of complementary rotors 9 is located in the first pumping chamber 20. Similarly, a pair of complementary rotors is located in each of the pumping chambers 21 and 22. For the sake of clarity, the two rotating shafts 8 and the rotors 9 of the multistage pump 1 are not represented in FIGS. 4 to 11.

As can be seen in FIG. 4, the suction 23 of the multistage pump 1 is extended by the inlet of the first pumping chamber 20, while the outlet of the third pumping chamber 22 is extended by the discharge 24 of the multistage pump 1.

The housing 11 partially delimits the first pumping chamber 20, which one of the casings 3 closes on one face at the end 2*a* of the multistage pump body 2. The housing 11 and the housing 12 delimit together the second pumping chamber 21. The housing 12 partially delimits the third pumping chamber 22, which one of the casings 3 closes at one face at the end 2*b* of the multistage pump body 2.

Gaskets compressed in grooves create seals between the housings 11 and 12. They bear the reference numeral 25 in FIG. 5.

Figure 5:
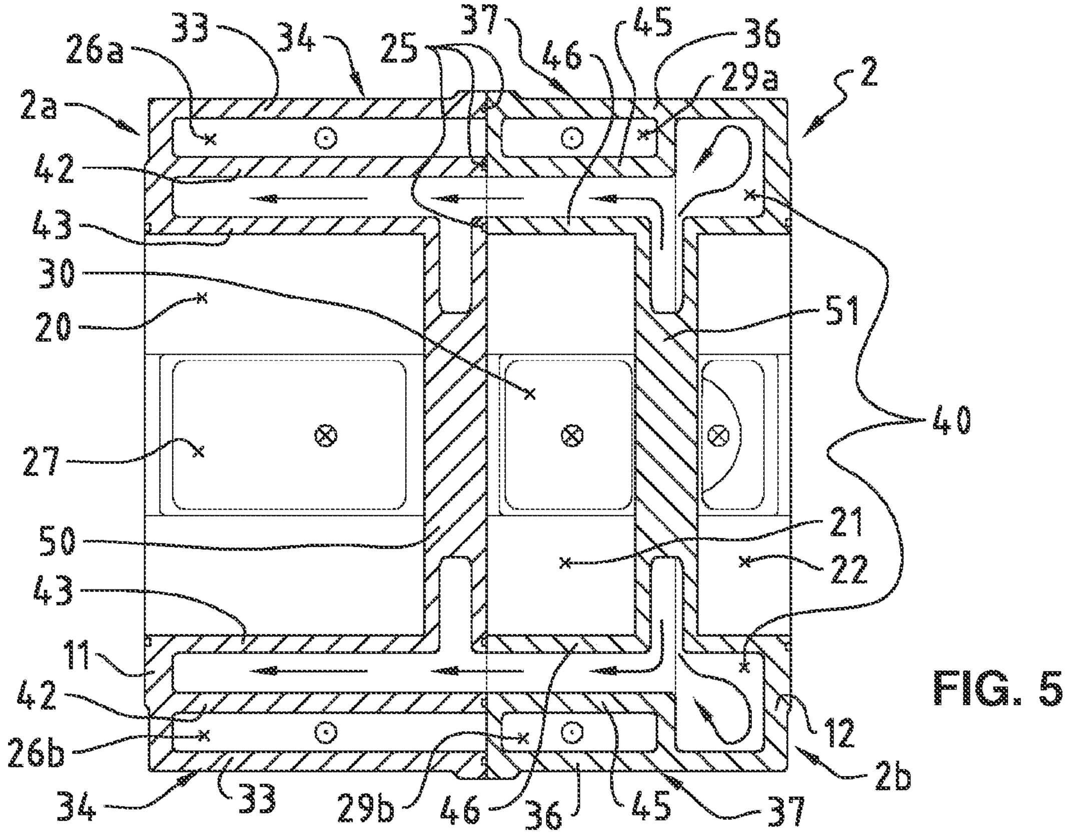
FIG. 5 is a longitudinal sectional view along the horizontal line V-V of FIG. 4 and represents the same multistage pump body as that in FIGS. 3 and 4.

As can be seen in FIGS. 4 and 5 considered together, two connecting ducts 26*a* and 26*b*, symmetrical with respect to one another, connect the outlet 27 of the first pumping chamber 20 to the inlet 28 of the second pumping chamber 21. The ducts 26*a* and 26*b* are first connecting ducts. A pair of second connecting ducts 29*a* and 29*b*, symmetrical with respect to one another, connect the outlet 30 of the second pumping chamber 21 to the inlet 31 of the third pumping chamber 22. In FIG. 4, the arrow C symbolizes the gas flow from the suction 23 to the discharge 24.

The first connecting ducts 26*a* and 26*b*, as well as the second connecting ducts 29*a* and 29*b*, are lateral ducts of the multistage pump body 2. Each of the first connecting ducts 26*a* and 26*b* is partially delimited by a lateral wall which is a heat-conducting wall 33 having an external surface 34 on the outside of the multistage pump 1. The heat-conducting walls 33 are first heat-conducting walls. Each of the second connecting ducts 29*a* and 29*b* is partially delimited by one of the two lateral walls which are second heat-conducting walls 36 each having an external surface 37 on the outside of the multistage pump 1.

The multistage pump body 2 delimits a leak-tight conduit 40 for the circulation of the cooling liquid which can be, for example, water.

Figure 6:
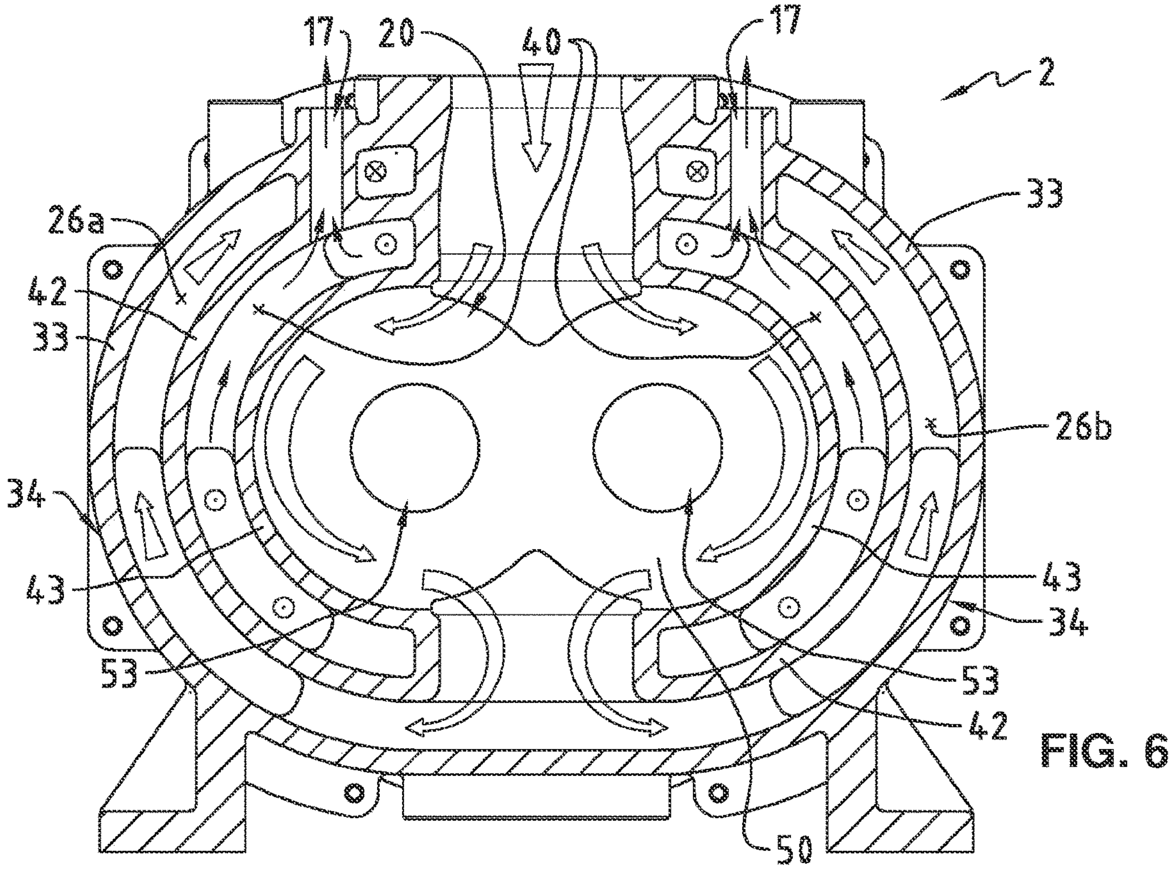
FIG. 6 is a cross-sectional view along line VI-VI of FIG. 4 and represents the same multistage pump body as that in FIGS. 3 and 4.

As can be seen in FIG. 6, the leak-tight conduit 40 communicates with the outlets 17, through which the cooling fluid present in this leak-tight conduit can be evacuated.

Figure 7:
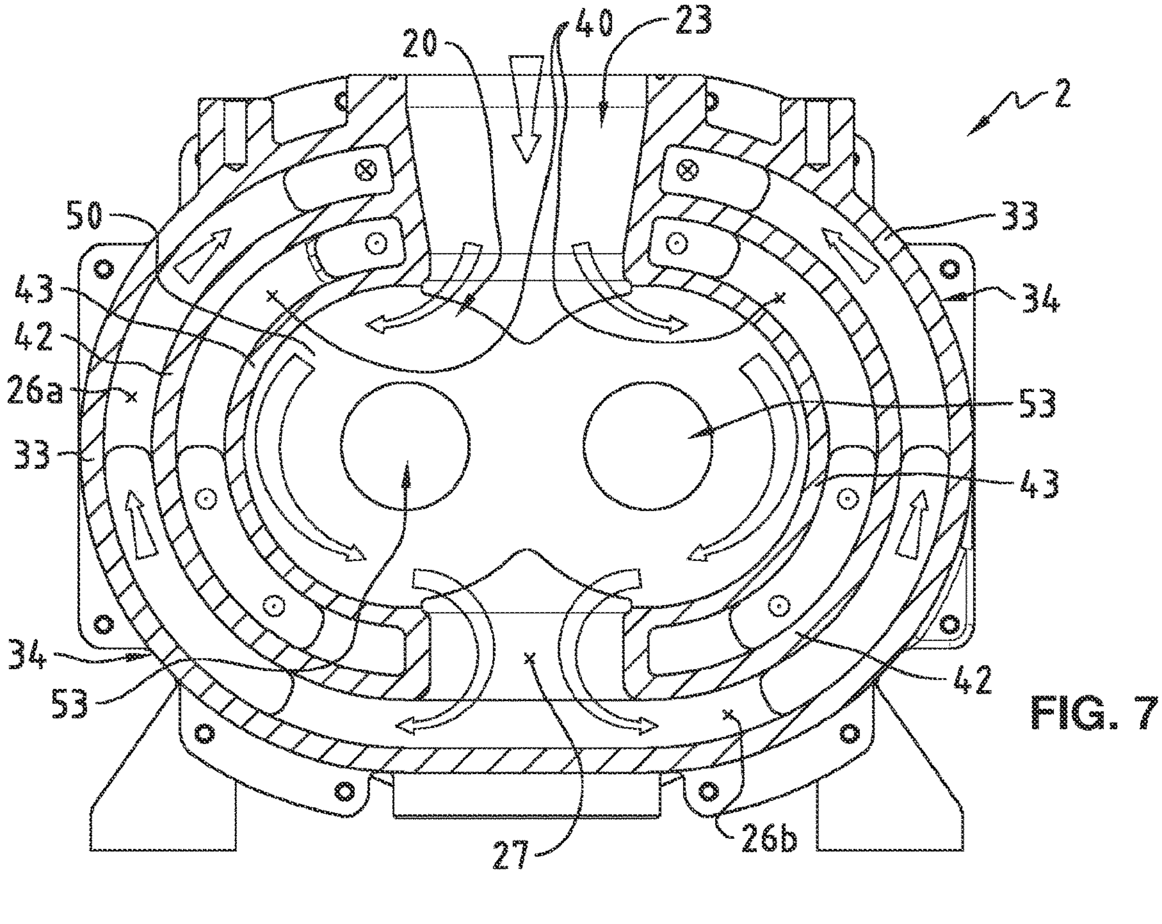
FIG. 7 is a cross-sectional view along line VII-VII of FIG. 4 and represents the same multistage pump body as that in FIGS. 3 and 4.
Figure 8:
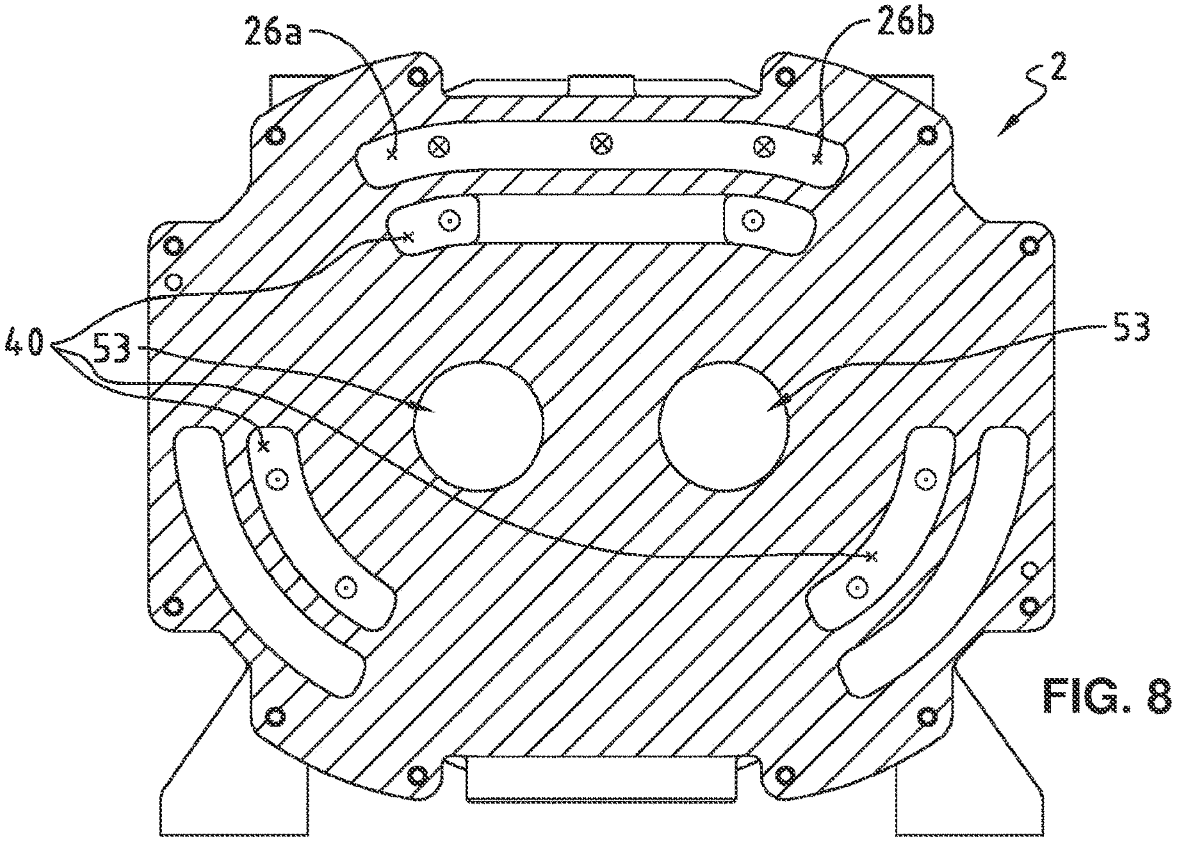
FIG. 8 is a cross-sectional view along line VIII-VIII of FIG. 4 and represents the same multistage pump body as that in FIGS. 3 and 4.

As can be seen in FIG. 7, the leak-tight conduit 40 partially surrounds the first pumping chamber 20.

Figure 9:
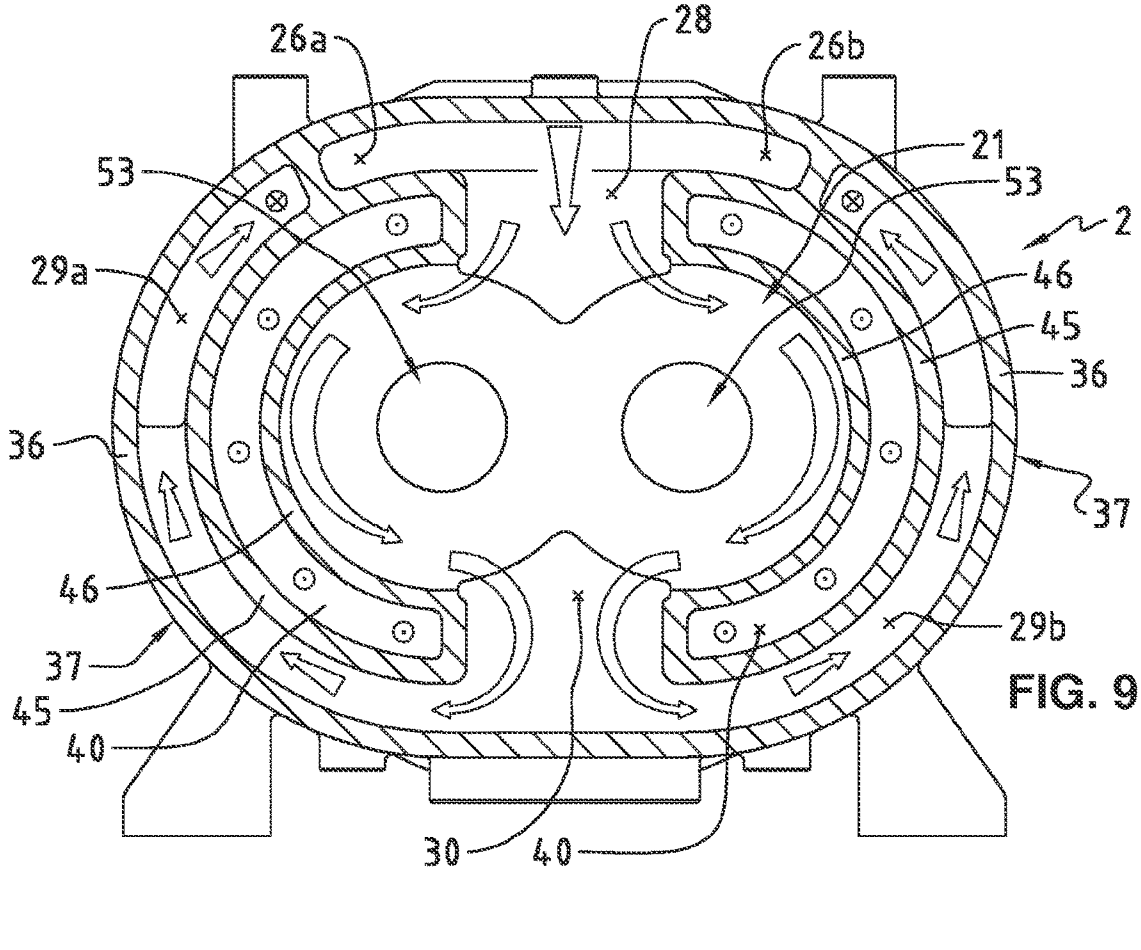
FIG. 9 is a cross-sectional view along line IX-IX of FIG. 4 and represents the same multistage pump body as that in FIGS. 3 and 4.

As can be seen in FIG. 9, the leak-tight conduit 40 partially surrounds the second pumping chamber 21.

Figure 10:
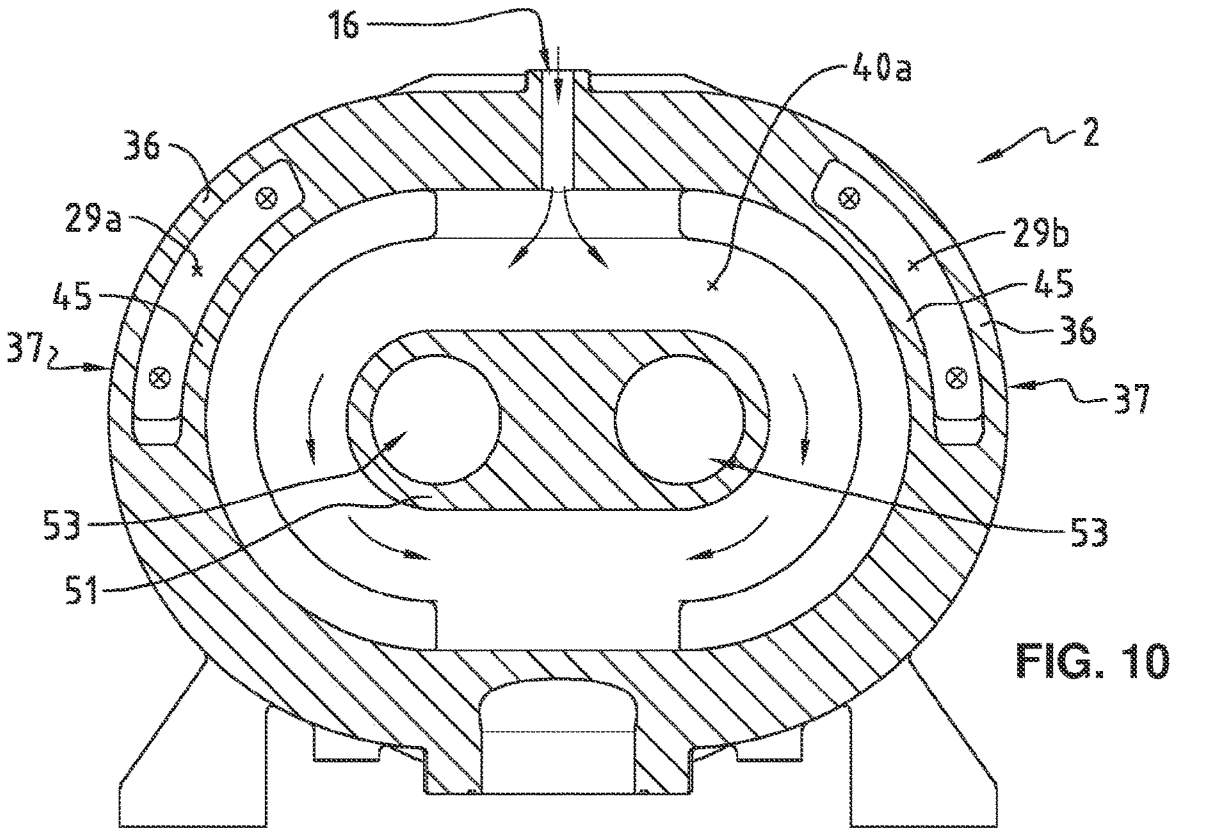
FIG. 10 is a cross-sectional view along line X-X of FIG. 4 and represents the same multistage pump body as that in FIGS. 3 and 4.

As can be seen in FIG. 10, the leak-tight conduit 40 comprises a distribution chamber 40*a*, into which the inlet 16 comes out, which makes it possible to supply the leak-tight conduit 40 with cooling fluid.

Figure 11:
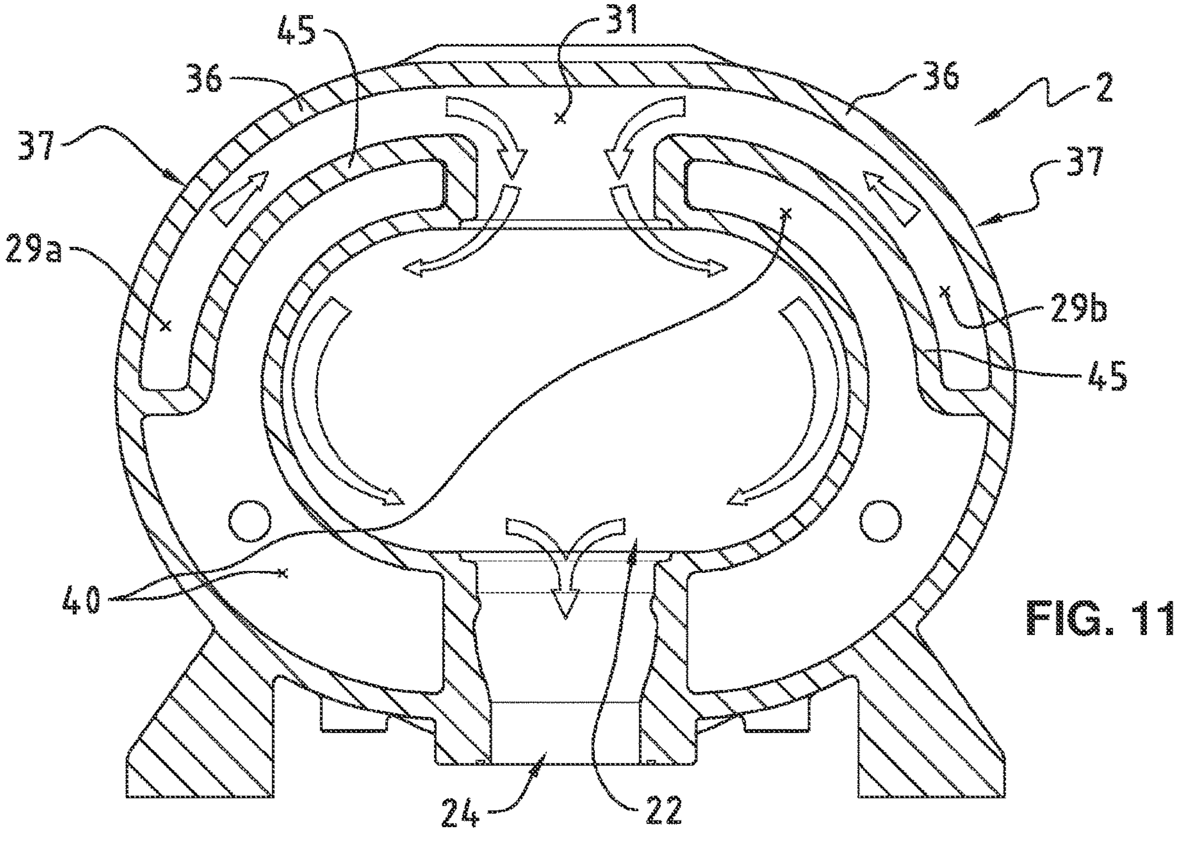
FIG. 11 is a cross-sectional view along line XI-XI of FIG. 4 and represents the same multistage pump body as that in FIGS. 3 and 4.

As can be seen in FIG. 11, the leak-tight conduit 40 partially surrounds the third pumping chamber 22.

As can be seen in FIGS. 5 à 7, the leak-tight conduit 40 passes between the first pumping chamber 20 and each of the first connecting ducts 26*a* and 26*b*. A heat-conducting partition 42 partially delimits the first connecting duct 26*a* and the leak-tight conduit 40, that it separates one from the other. Another heat-conducting partition 42 partially delimits the first connecting duct 26*b* and the leak-tight conduit 40, that it separates one from the other. A heat-conducting partition 43 partially delimits the first pumping chamber 20 and the leak-tight conduit 40, that it separates one from the other.

When the pump 1 operates, the gas suctioned by this pump 1 is compressed in the first, second and third pumping chambers 20 to 22, during which it warms up.

The heat of gases passing in the first connecting ducts 26*a* and 26*b* is removed both by the heat-conducting walls 33 and by the heat-conducting partitions 42. A first cooling takes place owing to a transfer of heat to the ambient air by radiation and natural convection, at the external surfaces 34 of the heat-conducting walls 33. A second cooling is achieved at the heat-conducting partitions 42, by the cooling liquid circulating in the leak-tight conduit 40. The gases passing in the first connecting ducts 26*a* and 26*b* are thus subjected to the accumulation of two simultaneous coolings, which are carried out on the two wide sides of each first connecting duct 26*a* or 26*b*.

In addition to cooling the heat-conducting partition 42, the cooling liquid circulating in the leak-tight conduit 40 cools the heat-conducting partition 43 and thus the first pumping chamber 20 through use of this heat-conducting partition 43.

As can be seen in FIGS. 5 and 9, the leak-tight conduit 40 passes between the second pumping chamber 21 and each of the second connecting ducts 29*a* and 29*b*. A heat-conducting partition 45 partially delimits the second connecting duct 29*a* and the leak-tight conduit 40, that it separates one from the other. Another heat-conducting partition 45 partially delimits the second connecting duct 29*b* and the leak-tight conduit 40, that it separates one from the other. A heat-conducting partition 46 partially delimits the second pumping chamber 21 and the leak-tight conduit 40, that it separates one from the other.

The heat of the gases passing in the second connecting ducts 29*a* and 29*b* is removed both by the heat-conducting walls 36 and by the heat-conducting partitions 45. A cooling takes place by natural convection and heat transfer to the ambient air at the external surfaces 37 of the heat-conducting walls 36. Another cooling is achieved at the heat-conducting partitions 45, by the cooling liquid circulating in the leak-tight conduit 40. The gases passing in the second connecting ducts 29*a* and 29*b* are thus subjected to the accumulation of two simultaneous coolings, which are carried out on the two wide sides of each second connecting duct 29*a* or 29*b*.

In addition to cooling the heat-conducting partition 45, the cooling liquid circulating in the leak-tight conduit 40 cools the heat-conducting partition 46 and thus the second pumping chamber 21 through use of this heat-conducting partition 46.

A portion of the leak-tight conduit 40 is located in the separating wall 50 between the first pumping chamber 20 and the second pumping chamber 21, between which it passes, which results in improved cooling of these first and second pumping chambers 20 and 21. A portion of the leak-tight conduit 40 is located in the separating wall 51 between the second pumping chamber 21 and the third pumping chamber 23 <sic. 22>, between which it passes, which improves the cooling of these second and third pumping chambers 21 and 22.

In FIGS. 6 to 10, two axial passages each for one of the rotating shafts 8 bear the reference numeral 53 and pass right through the separating wall 50 and the separating wall 51.

The invention is not limited to the embodiment described above. In particular, a multistage pump body according to the invention may comprise only a single axial passage 53 for a single rotating shaft 8, for example in the case where it forms part of a rotary vane pump.

The invention claimed is:

1. Multistage pump body, comprising at least:

a first pumping chamber, a second pumping chamber, an axial passage for a rotating shaft, said axial passage connecting the first and second pumping chambers and defining a radial direction that is perpendicular to a longitudinal axis of the axial passage, a connecting duct putting an outlet of the first pumping chamber into communication with an inlet of the second pumping chamber, wherein the connecting duct is a lateral duct of the multistage pump body which comprises at least a heat-conducting wall partially delimiting the connecting duct and having an external surface on an outside, and a leak-tight conduit for circulation of a cooling liquid, at least a portion of the connecting duct passing between the external surface of the heat-conducting wall and the leak-tight conduit, wherein at least a portion of the leak-tight conduit is disposed between the connecting duct and at least one of the first and second pumping chambers in the radial direction.

2. Multistage pump body according to claim 1, wherein at least a further portion of the leak-tight conduit passes between the first pumping chamber and the second pumping chamber.

3. Multistage pump body according to claim 1, further comprising at least one heat-conducting partition separating the connecting duct and the leak-tight conduit from one another.

4. Multistage pump body according to claim 1, further comprising at least one heat-conducting partition separating the leak-tight conduit and the first pumping chamber from one another.

5. Multistage pump body according to claim 1, wherein the leak-tight conduit partially wraps around the first pumping chamber and/or the second pumping chamber.

6. Multistage pump body according to claim 1, wherein the leak-tight conduit comprises at least one inlet for the cooling liquid and at least one outlet for the cooling liquid.

7. Multistage pump body according to claim 1, having a first side and a second side opposite the first side with respect to the axial passage, the connecting duct passing on the first side of the multistage pump body, the multistage pump body delimiting another connecting duct putting the outlet of the first pumping chamber into communication with the inlet of the second pumping chamber, this other connecting duct passing on the second side of the multistage pump body.

8. Multistage pump body according to claim 1, wherein the connecting duct is a first connecting duct, the multistage pump body comprising a third pumping chamber and a second connecting duct which is a duct putting an outlet of the second pumping chamber into communication with an inlet of the third pumping chamber, the heat-conducting wall being a first heat-conducting wall, the multistage pump body comprising at least a second heat-conducting wall, this second heat-conducting wall partially delimiting the second connecting duct and having an external surface on the outside, at least a portion of the second connecting duct passing between this external surface of the second heat-conducting wall and the leak-tight conduit.

9. Multistage pump comprising the multistage pump body according to claim 1, the external surface of the heat-conducting wall being outside of the pump.

10. Multistage pump according to claim 9, further comprising at least a first rotor to produce a displacement of gas downstream in the first pumping chamber, at least a second rotor to produce a displacement of gas downstream in the second pumping chamber, and a rotating shaft carrying the first and second rotors.

11. Multistage pump according to claim 10, said multistage pump being a lobe pump or a claw pump or a gear pump and comprising at least another first rotor in the first pumping chamber, at least another second rotor in the second pumping chamber and another rotating shaft carrying the other first and second rotors, the first rotor and the other first rotor being adapted to produce a displacement of gas downstream in the first pumping chamber by being driven in opposite directions, the second rotor and the other second rotor being adapted to produce a displacement of gas downstream in the second pumping chamber by being driven in opposite directions.

12. Multistage pump body according to claim 1, further comprising a rotating shaft, wherein said portion of the leak-tight conduit is disposed partially around the rotating shaft.

* * * * *